United States Patent [19]

Jurchuk et al.

[11] Patent Number: 5,018,338
[45] Date of Patent: May 28, 1991

[54] SLICED FOOD HANDLING DEVICE

[75] Inventors: Paul Jurchuk, Kitchener; David Hooper, Waterloo; Alan Staff, Kitchener; Hans Sitt, Waterloo, all of Canada

[73] Assignee: Thurne Engineering Co., Limited, Norwich, England

[21] Appl. No.: 427,425

[22] Filed: Oct. 27, 1989

[30] Foreign Application Priority Data

Nov. 28, 1988 [CA] Canada .................................. 584266

[51] Int. Cl.⁵ ........................ B65B 35/50; B65B 39/12
[52] U.S. Cl. ...................................... 53/532; 53/251; 53/260
[58] Field of Search ................. 53/251, 250, 249, 252, 53/260, 254, 534, 532

[56] References Cited

U.S. PATENT DOCUMENTS

| | | | |
|---|---|---|---|
| 4,048,784 | 9/1977 | Toby .................................. | 53/260 X |
| 4,478,024 | 10/1984 | Vedvik et al. ..................... | 53/260 X |
| 4,611,458 | 9/1986 | Prakken ............................. | 53/251 X |
| 4,648,237 | 3/1987 | Total .................................. | 53/260 X |
| 4,677,810 | 7/1987 | Spano ................................. | 53/251 X |

FOREIGN PATENT DOCUMENTS 3049606 2/1982 Fed. Rep. of Germany ........ 53/532

*Primary Examiner*—James F. Coan
*Attorney, Agent, or Firm*—Gowling, Strathy & Henderson

[57] ABSTRACT

Apparatus is disclosed for transfer of workpieces such as stacks of sliced sausage from a band conveyor into the cavities of a molded package, the latter being advanced transversely of the movement of the band conveyor. The device utilizes a system of stems protruding between the bands of the band conveyor to raise the product upwardly from the band conveyor, whereupon a shuttle engages two workpieces by two finger systems having spring-loaded transverse fingers moving transversely of the movement of the band conveyor. The stems are then lowered below the level of the band conveyor. The shuttle is shifted to a position above the particular packaging cavities, whereupon a plunger strikes each workpiece in a downward direction, whereby the spring-loaded, normally generally horizontal fingers of the finger systems are forced to swing downwardly into open position to allow discharge of the workpieces. The finger systems are then moved apart from each other, the plungers raised and the entire shuttle driven back to a position above the respective band conveyor. The advance in the art is in structural simplicity of the mechanism for raising the workpieces above the band conveyor and of the structure of the shuttle itself, in particular of its finger systems with the spring-loaded fingers.

22 Claims, 9 Drawing Sheets

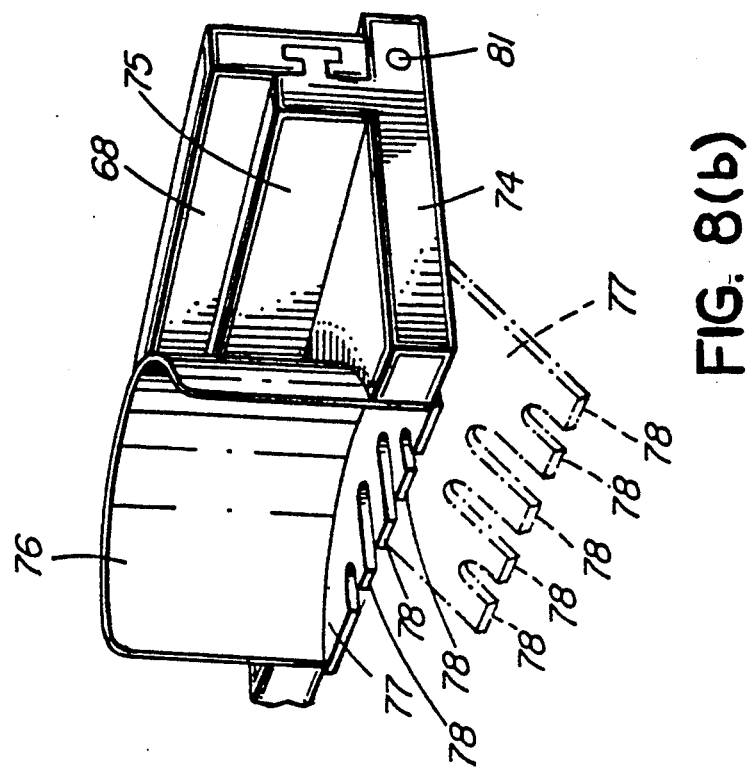
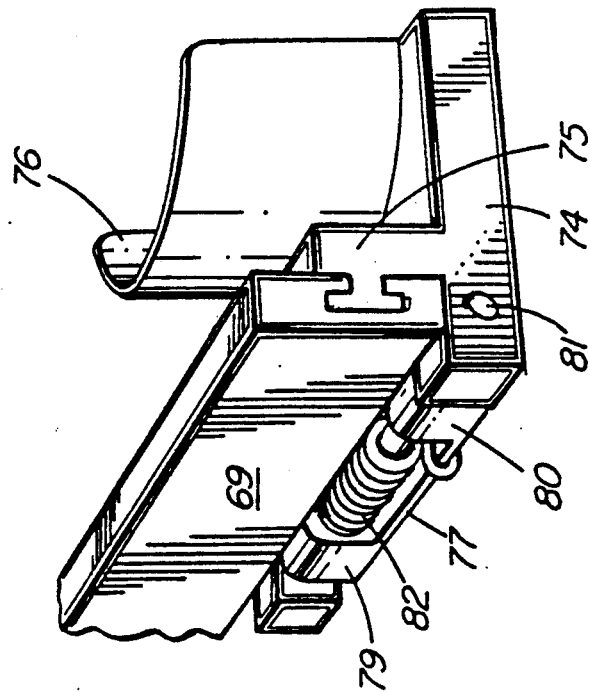
FIG. 8(b)
FIG. 8(a)

SLICED FOOD HANDLING DEVICE

The present invention relates to an apparatus for transfer of a workpiece having a predetermined shape and size, from conveyor means having a generally horizontal conveying path defined by an upper run of a number of parallel, spaced apart endless bands trained about guide roller means, to an unloading station remote from the conveyor means.

The apparatus is particularly suitable for, but is not exclusively directed to, the transfer of stacks of sliced food product such as sausage, from a band conveyor moving in a predetermined straight direction, to a packaging cavity which is remote from the band conveyor and which, preferably, advances in a direction transversely to the band conveyor.

The prior art to which the present invention pertains is exemplified by U.S. Pat. No. 4,478,024 which issued to Vedvik et al. on Oct. 23, 1984, and by U.S. Pat. No. 4,648,237 which issued to R. V. Total on Mar. 10, 1987.

The aforesaid prior art patents relate to and are described and claimed strictly within the context of food packaging. The present invention, while also primarily directed to that field of technology, is also capable of handling other kinds of workpieces and particularly those kinds of workpieces which are in the form of stacks of generally flat products.

In Vedvik et al., apparatus is shown which aligns the slices in stacks of sliced food products and loads the stacks into container cavities. The device comprises means for detaining on a band conveyor a stack of the products. A stack positioning member is movable along the conveyor surface to push the stack into engagement with a stack former for aligning the slices of food such as sausage. At the same time, the stack positioning member retards movement of the next upstream stack on the conveyor and then pushes the previously aligned stack to a pickup station. The pickup station includes a base which is disposed downstream of the band conveyor. It further includes a head of a generally circular plan having a plurality of radially reciprocating downwardly dependent fingers having inwardly turned flanges at their free lower ends to engage the aligned stack resting on the base and to then move it, by a pendulum motion of the head, to a position above a packaging cavity. In order to discharge the workpiece into the cavity, the lower ends of the fingers are first spread apart while downward dependent guide elements remain in place and a plunger is activated to push the stack into the respective cavity.

When viewed from the standpoint of the present invention, the Vedvik et al. patent presents a complex arrangement having a number of mechanisms and mechanical parts operatively associated with the conveying means. In particular, the arrangement of the pickup head is extremely complex and thus not only expensive to produce but also difficult to maintain in reliable operation. The displacement of the products onto the base below the pickup head is cumbersome and requires substantial space.

The solution according to Total presents advance over Vedvik et al. in that Total recognized that it is of advantage to raise the workpiece above the level of the band conveyor and to pick it up by a pickup head from there, thus eliminating the intermediate loading bases required in Vedvik et al.

When compared with Total and Vedvik et al., the present invention exhibits significant advantages over both references. First, Total raises the workpiece above the band conveyor by horizontally elongated support blocks which protrude between the bands of the conveyor. The blocks occupy a substantial space longitudinally, which is apparent when the Total device is viewed in a side view. Such arrangement substantially limits the distance at which horizontally elongated fingers or the like transverse members could be inserted underneath the raised workpieces. This is an indication that Total still considered it necessary to use a pickup head of basically the same complex structure as that of Vedvik et al. The principal drawback of the Veedvik et al. pickup head resides not only in its complexity, but also in that the inwardly turned tips or flanges have only a limited length which is unsuitable for certain workpieces, especially where flexibility of the product is substantial.

It is an object of the present invention to further advance the art of the conveyors with emphasis on the general structural arrangement which is exemplified by the above two patents.

Referring to the invention in general terms and in particular reference to one aspect, the present invention provides apparatus for transfer of a workpiece having a predetermined shape and size, from conveyor means having a generally horizontal conveying path defined by an upper run of a number of parallel, spaced-apart endless bands trained about guide roller means, to an unloading station remote from the conveyor means, said apparatus comprising, in combination: a) workpiece retainer means including at least two stop members spaced apart transversely of the conveying path, said stop members being associated with the conveyor means for selectively assuming a retracted position, in which the stop members clear said conveying path, and an extended position in which the stop members protrude, between the respective bands, above the conveying path, to retain the workpiece on the conveying path while the conveyor continues to run; b) workpiece raising means including a set of at least three normally generally vertical support pins spaced apart and adapted to selectively assume a lowered position in which the tops of the pins clear the conveying path, and a raised position, in which the support pins extend upwardly between the bands, with the tops disposed above the conveying path, the tops being arranged in a pattern for supporting a respective workpiece previously retained by said retainer means; c) carriage means for engaging a respective raised workpiece supported on the tops and for carrying the workpiece away from said conveyor means to said unloading station, said carriage means including: i) a pair of opposed finger systems defining a plurality of normally generally horizontal, parallel and coplanar fingers, one system including at least one first finger, the other system including at least one second finger, said first and second fingers pointing in opposite directions, each toward the opposed finger system; ii) first actuation means for selectively moving the finger systems from an open position in which free end portions of the fingers are remote from each other and from a respective raised workpiece, to a closed position wherein the free end portions are disposed immediately underneath a respective raised workpiece, whereby, upon lowering of the raising means, the workpiece rests upon the horizontal fingers; iii) second actuation means for moving the closed finger systems from a first position in which the fingers are disposed above the conveyor means, to a second position in which the fingers are disposed at the unloading station; iv) discharge means for discharging the workpiece from the carriage means to said unloading station.

In another aspect of the present invention, apparatus is provided for the handling of stacks of sliced food product through an assembly of components along a generally linear path, comprising: a) a loading station with at least one loading position, transfer means and an unloading station, wherein said loading station includes a multi-banded conveyor for movement of stacks along the linear path to the loading position, with stack detection and arresting means and stack elevating means associated with the loading position; said transfer means includes carriage means reciprocally moveable in a linear direction parallel to said path between the loading station and the unloading station, the carriage means having stack support means adapted to cooperate with the stack elevating means during loading to substantially support the stack during loading and subsequent movement of the carriage; and said carriage means further includes ejection means associated with the unloading station for discharge of stacks from the support means.

The invention will now be described by way of a preferred embodiment with reference to the accompanying diagrammatic, simplified drawings wherein:

FIG. 8 is a diagrammatic perspective view showing the general arrangement of the left hand pair of the pickup members of the shuttle as viewed in FIG. 2, with the remaining parts of the shuttle removed for the sake of clarity.

Figure 1:
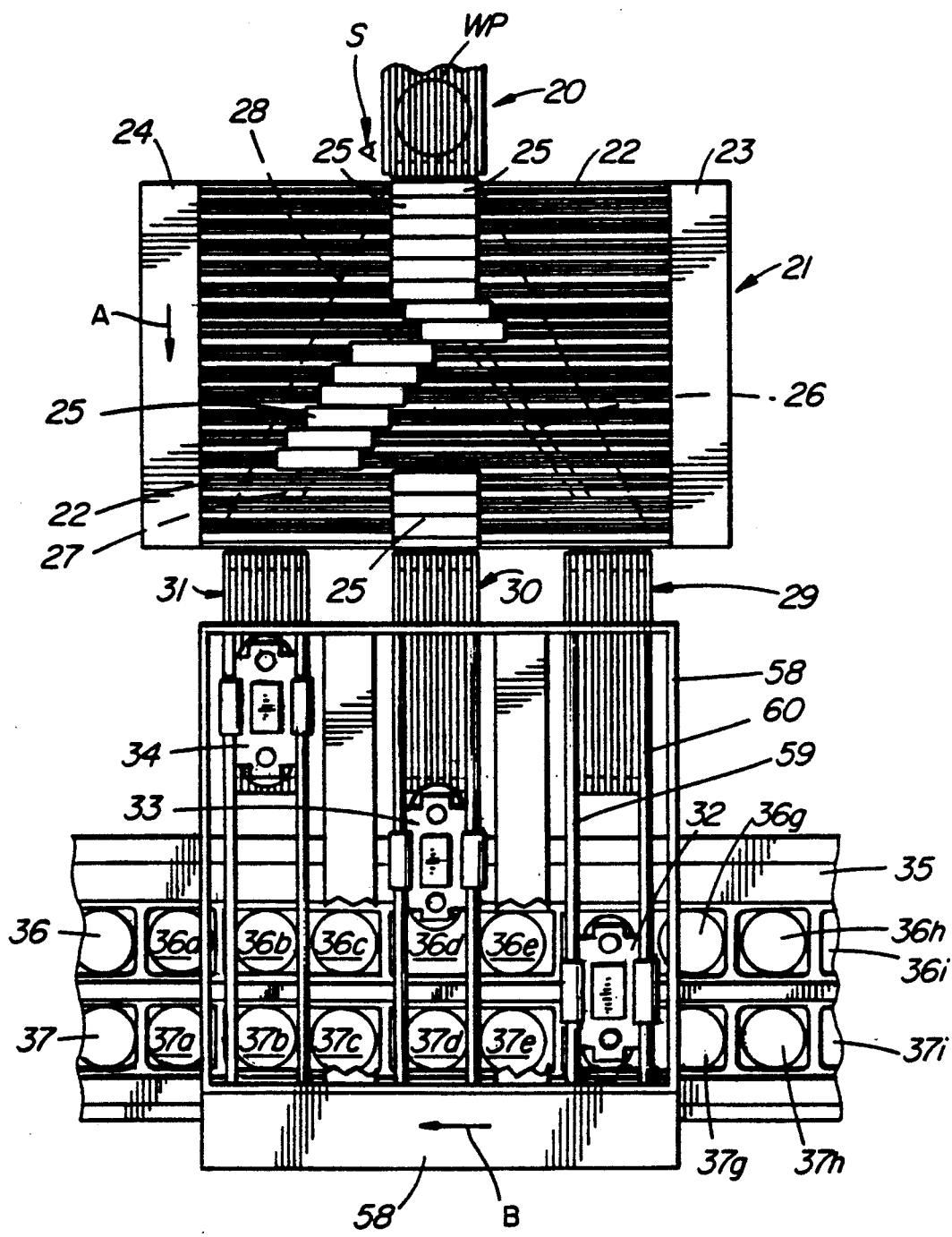
FIG. 1 is a top plan view showing the arrangement of a part of a conveying system in which the present invention can be utilized, some of the features of the present invention being omitted from the view for clarity.

Turning firstly to FIG. 1, the present invention is shown in the environment of a packaging device for stacks of sliced meat. The top centre of FIG. 1 shows a conveying device generally indicated as 20. FIG. 1 only shows the downstream end of the conveying device 20, the upstream end thereof being operatively associated with a known slicing device and other known elements for automatic production of stacks of food such as sliced sausage which would normally arrive at the shown end of the conveying device to be transferred to channelizing means 21.

The channelizing means 21 is well known in the art and is described in detail, for instance, in Vedvik et al., which is incorporated herein by reference.

The channelizing means 21, sometimes also referred to as a diverting conveyor, is an endless conveyor whose surface is made of a series of pairs of rods 22. The rods are attached to suitable drive means disposed at opposed sides 23, 24, which are indicated in a diagrammatic fashion by two rectangular boxes. The drive means contain the usual arrangement of sprockets, chains or belts and the like driven by a suitable motor such that the system of the pairs of rods 22 moves in the direction of the arrow A along the upper run visible in FIG. 1, then curls under and returns beneath the upper run as is well known in the art of endless conveyors.

Sleeves 25 are transversely slidable on the of rods 22 from one side, 24, to the other side 23. Each pair of rods 22 guides one sleeve 25. Two diverters 26, 27, are mounted under the upper run of the rods 22 and are arranged to become selectively engaged with the underside of the sleeves 25 of the upper run to divert same in a selected direction. This brings the sleeves 25 to a desired transverse location at the downstream end of the conveyor 21.

Thus, as seen in FIG. 1, the forwardmost group of sleeves 25 is disposed at the centre of the conveyor rods 22. This group of sleeves 25 had not been guided by any of the diverters and therefore remained at the centre, aligned with the conveying means 20. The extreme upstream sleeves near the conveying device 20 are also centrally disposed. The group next to the forwardmost group is shown as being diverted to the left-hand side of FIG. 1 by the diverter 27 while two sleeves immediately following the last mentioned group are at the beginning of diversion, by diverter 26, to the right-hand side of FIG. 1, it being understood that another four of the sleeves 25 would also be diverted by the diverter 26, before it becomes disengaged to allow another series of sleeves 25 to pass centrally. Thus, a workpiece brought by the conveyor 20 can be diverted to a selected one of the three conveyors 29, 30, 31, depending on the instant arrangement of the diverters 26, 27. A converger 28 is disposed underneath the lower run of the conveying device and engages the previously diverted sleeves to gather them back to the centre, before they return to the upper run at the downstream end of the conveyor 20.

The device for the diverting of the flow of workpieces is known, for instance, from the Total patent and therefore is not described in greater detail herein.

The three conveyors 29, 30 and 31 are all of a generally identical structural arrangement, and it will be understood that the number of such conveyors is optional. Each conveyor 29, 30 and 31 is associated with a shuttle or carriage 32, 33 and 34 respectively, adapted to move above the conveyor in parallel with the conveyance path of the respective conveyor 29, 30, 31, as best seen in FIG. 1.

Each shuttle is arranged to move from a position above its associated conveyor 29, 30, 31 (shuttle 34 is above conveyor 31) to a position which is remote from its respective conveyor (shuttle 32 is remote from the conveyor 29). The shuttles 32, 33 and 34 can also be referred to as "transfer carriages". The position shown by shuttle 34 is generally referred to as a "loading zone" with at least one loading position (in the embodiment shown there are two loading positions) and the position illustrated for shuttle 32 is also referred to as an "unloading zone".

The unloading zone of the shuttle 32 is operatively associated with a transversely advancing packaging conveyor 35 which advances in an indexed fashion in the direction from the right to the left of FIG. 1, in the direction of arrow B. The arrangement of the conveyor 35 is such that it incorporates a number of workpiece holders in which preformed packaging members define cavities 36 and 37. The cavities 36, 37 are arranged in an arrangement of two parallel rows, although the number of the rows is optional.

The conveyor 29 is shown in a diagrammatic fashion in the drawings of FIGS. 3–6. It has a generally horizontal conveying path which is defined by an upper run of a number of spaced apart endless bands 38. The bands are trained about guide rollers 39, 40, mounted in a suitable frame 41. The guide rollers 39 are disposed at an upstream end of the conveyor 29, the rollers 40 at a downstream end thereof. The bands 38 are shown as flat bands being the preferred shape. Bands having circular or other cross-sectional configuration could be substituted if required.

The conveyor means 29 is provided with workpiece retainer or arresting means one embodiment of which is shown in the FIGS. 3, 4, 5 and 6. The workpiece retainer means is in effect a series of first retainer pins 42. In the illustrated embodiment, the number of first retainer pins is six. Those skilled in the art will appreciate, however, that as few as two pins or the like would suffice if suitably located, depending on the shape and rigidity of the workpiece to be transferred. The pins 42 are spaced from each other transversely across the conveying path of the conveyor 29. The retainer pins 42 form stop members associated with the respective conveyor means 29 such that they can assume an extended position and a retracted position as will be explained hereinafter.

Figure 7:
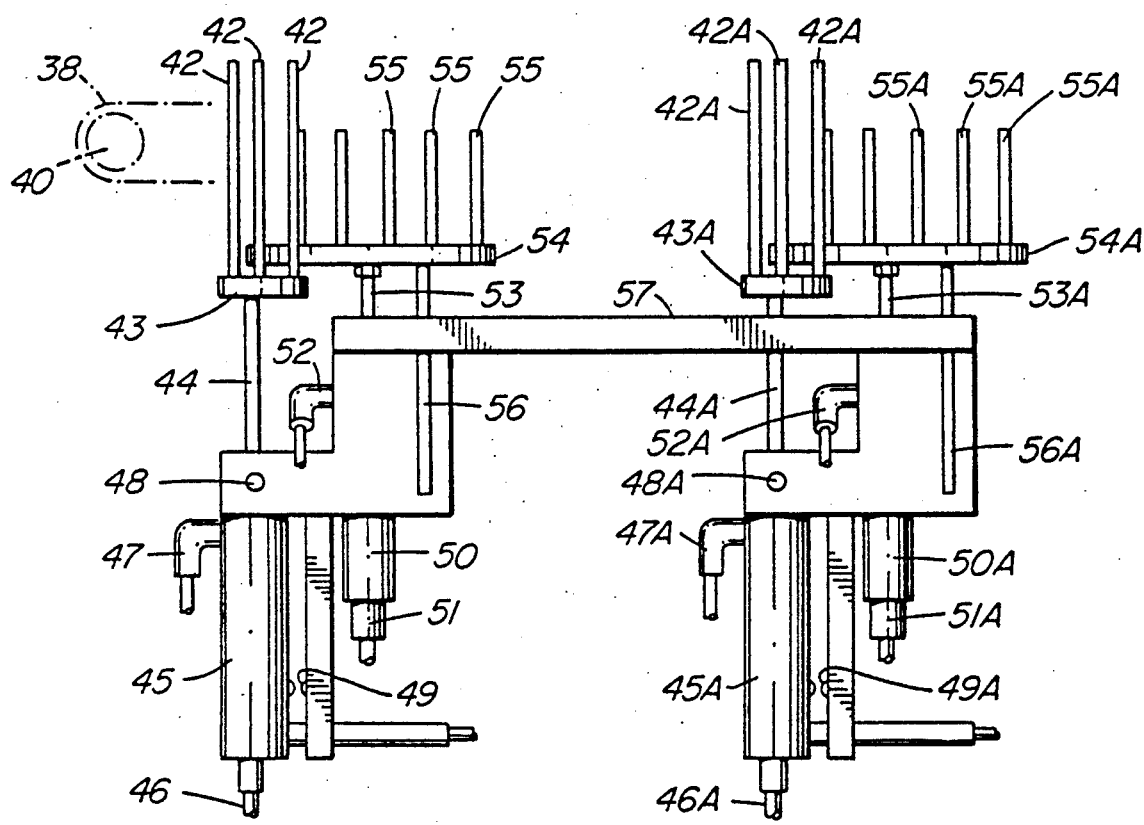
FIG. 7 is a diagrammatic side view of a preferred embodiment of workpiece retaining and elevating mechanism used with each of the aforesaid three conveyors of FIG. 1.

Turning now to FIG. 7, and referring in particular to the pins 42 shown therein, it will be seen that the pins 42 are fixedly secured to an arcuate base plate 43 which, in turn, is fixedly secured to a piston rod 44 of a pneumatic cylinder 45. The cylinder 45 communicates with a source of pressurized air through a lower port 46 or through an upper port 47, depending on the direction of desired movement of the piston rod 44 and thus of the pins 42. The operation of a pneumatic cylinder such as cylinder 45 is well known and therefore is not described in greater detail herein.

It is indicated in FIG. 7 that the assembly of the piston rod 44 and cylinder 45 is tiltably mounted about a pivot 48. The counter-clock-wise pivoting of the cylinder 45 results in a selective actuation of a microswitch 49. Accordingly, if the pins 42 move to the left of FIG. 7 (counter-clock-wise) about the pivot 48, the microswitch 49 is actuated and turned "on". A suitable counterbalance mechanism (not shown) turns the cylinder 45 clockwise back to the position of FIG. 7 when there is no pressure acting at pins 42. The switch is thus deactivated.

The length of the movement or stroke of the piston rod 44 is such as to enable the pins 42 to be retracted, in which position the pins clear the conveying path (FIG. 3), or extended. FIGS. 4 and 5 show the pins 42 in an extended position, protruding between the respective bands 38 above the conveying path to retain the respective workpiece, as will be explained later. In FIG. 6, the fingers 42 are again retracted. It can thus be seen that the selective actuation of the cylinder 45 moves the fingers 42 into two discrete positions as mentioned above.

The workpiece retainer means 42 are closely associated with a workpiece raising mechanism which also has a pneumatic cylinder 50 with a lower port 51 and an upper port 52.

The cylinder 50 has a piston rod 53 the upper free end of which is fixedly secured to a circular base plate 54. From the upper face of the base plate 54 protrudes workpiece raising means which, in the embodiment illustrated, is a set of generally vertically oriented support pins 55. A guide pin 56 passes through a mounting plate 57 and is slidable therein to prevent rotational movement of the base plate 54 about the axis of the piston rod 53, thus securing a permanent location of the pins 55 relative to the spaces between bands 38. The mounting plate 57 and its associated parts are fixedly secured to the frame 41 of the conveyor 29.

The workpiece raising means of which the support pins 55 are a part, are arranged for selective movement from a lowered position (FIGS. 3 and 4) in which the tops of the pins 55 clear the conveying path, to a raised position (FIG. 5 and FIG. 6), in which position the support pins 55 extend upwardly between the bands 38, with the tops of the pins disposed above the conveying path of the conveyer 29. The pins 55 are arranged in a number and pattern required by the nature of the workpiece to processed. When operating with workpiece having a flat underside, at least three of the support pins 55 are required.

The above described arrangement of the workpiece retainer means and of the workpiece raising or elevating means relates to those means as disposed at the downstream end of the conveyor 29 (FIGS. 3–6).

The mounting plate 57, however, also supports another, generally identical set of second workpiece retainer means and workpiece raising means. The parts of the second set are therefore referred to with the same reference numerals with index "A". Thus, the second retainer pins 42A are mounted on a base plate 43A secured to the free end of a piston rod 44A etc.

Figure 2:
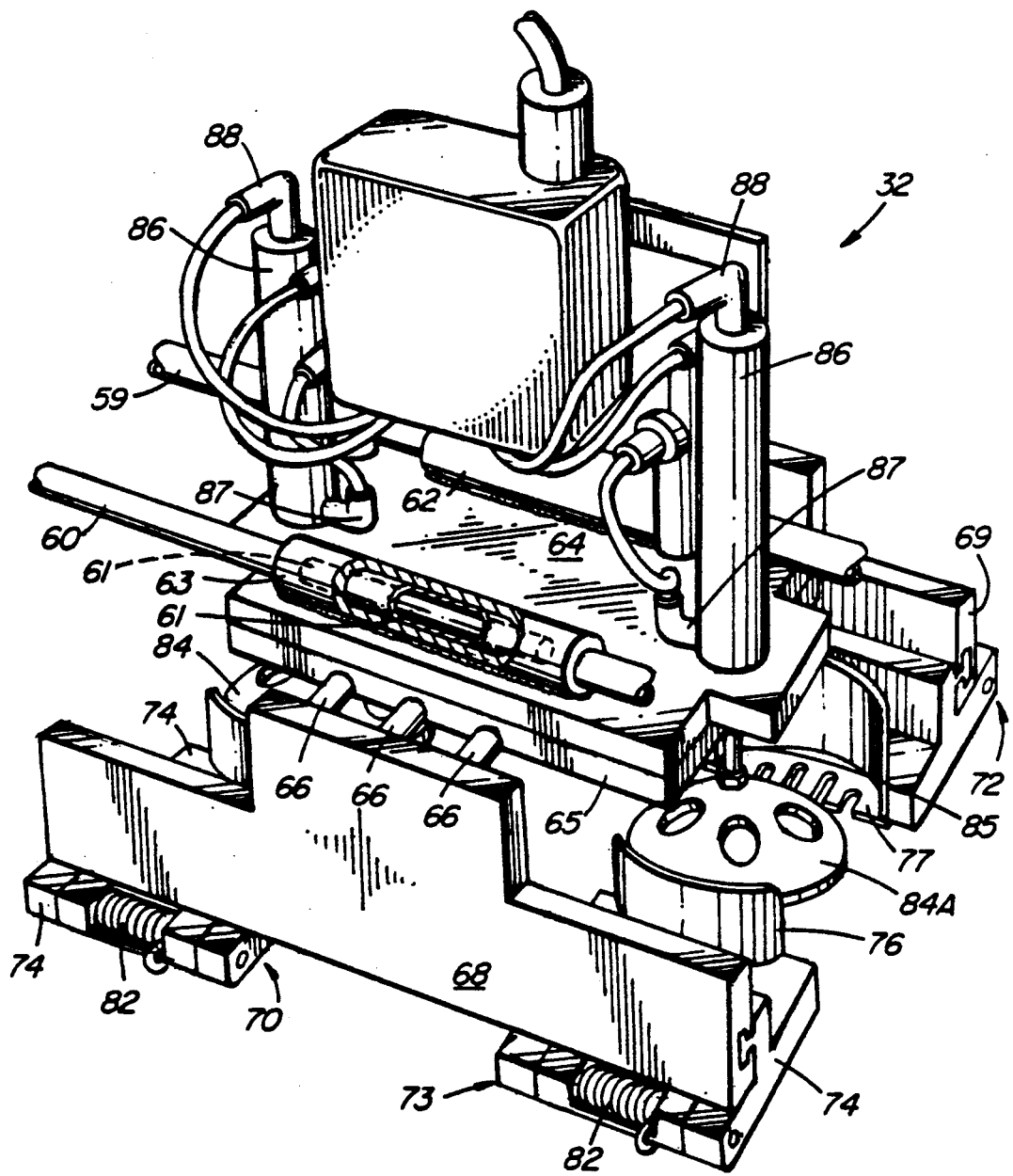
FIG. 2 is a simplified perspective view of the basic arrangement of one of the three shuttles shown in FIG. 1.

Attention is now directed to FIG. 2 which shows major parts of the shuttle 32 of FIG. 1. Reference should first be had to an upper frame 58 in FIG. 1. The frame 58 supports a system of guide rods including guide rods 59, 60. The guide rods are made of non-magnetic material. The tubes 59, 60 are provided at each end with an inlet/outlet port (not shown in the drawings) for pressurized air inlet or for bleeding. Within each of the tubes 59, 60 is located a cylindric piston-like member 61 made of a ferromagnetic material and corresponding in length approximately to the length of a respective mounting sleeve 62, 63. Each sleeve 62, 63 is provided with an electromagnet strong enough to secure interaction between the core 61 and the respective sleeve for movement of the sleeves 62, 63 in unison with the cores 61 (only one visible in FIG. 2). The sleeves 62 and 63 are slidable along the surface of the associated rods 59, 60, and can be moved along the rods 60, 59, in accordance with the displacement of the respective ferromagnetic piston or core 61. A base panel 64 is carried by sleeves 62 and 63 and is concurrently moved with the sleeves by displacement of core 61.

The displacement of the core 61 is governed by a pneumatic system whereby pressurized air is introduced at one end of the respective rods such as rods 59, 60 or at the other end thereof, the opposite end being bled as is known from pneumatic systems. The pneumatic magnetic system is well known and is preferred particularly in food processing industry wherein a high standard of cleanliness of the machinery surfaces is required by health regulations.

The described elements 59–64 and the parts secured thereto present an embodiment of what can be generally referred to as a shuttle, transfer carriage or carriage means. The base panel 64 is movable in reciprocating fashion in a direction generally parallel to the elongation of the associated conveyor 29 to thus bring the entire shuttle to one of the desired terminal positions.

The main purpose of the shuttle is to engage and transfer a respective workpiece supported which had been raised by the pins 55, 55A as will be described hereinafter.

To this end, each shuttle supports two pairs of opposed finger systems. One pair of the finger systems will now be described in greater detail.

Figure 9:
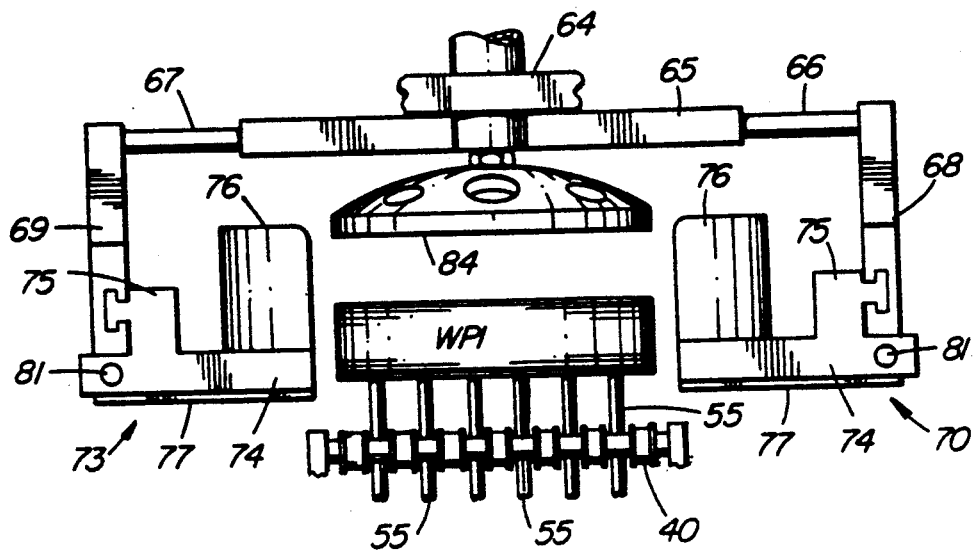
FIGS. 9–13 (FIG. 13 on the sheet of FIG. 7) are simplified end views taken from the bottom of FIG. 1 (i.e. from the left of FIG. 2), showing the sequence of different stages of the transfer by the shuttle of the workpiece from one of the three conveyors of FIG. 1 to the respective cavities shown at the lower portion of FIG. 1.
Figure 10:
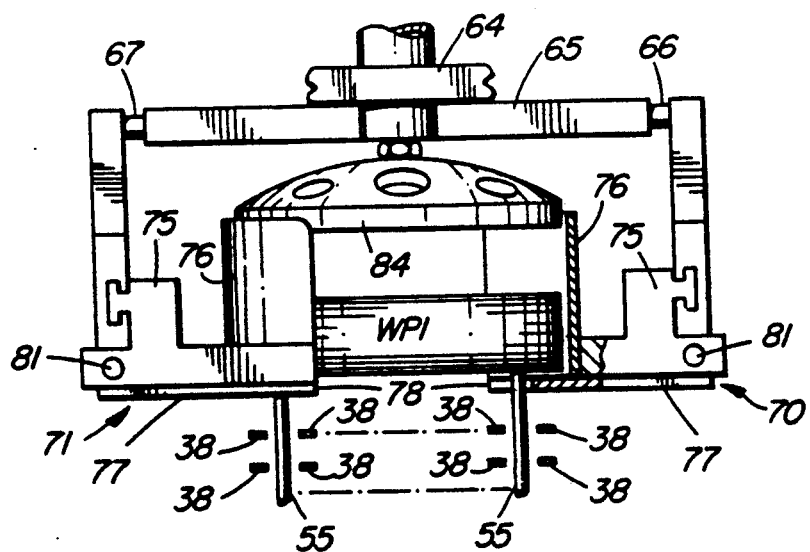
Figure 11A:
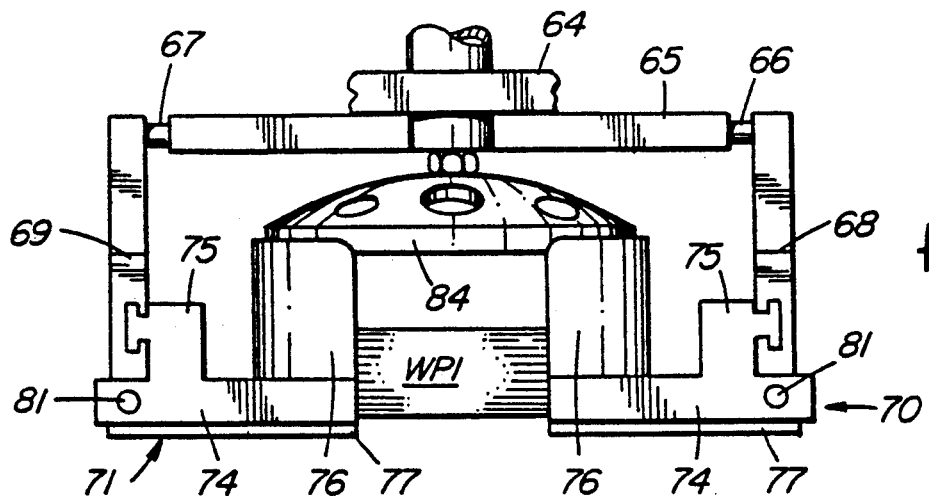
Figure 11B:
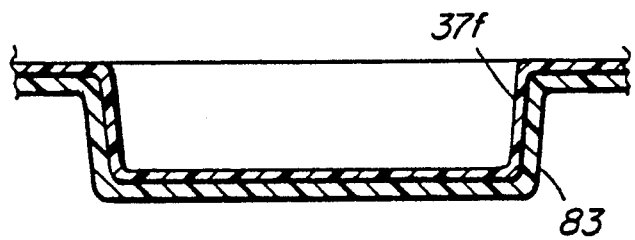
Figure 12:
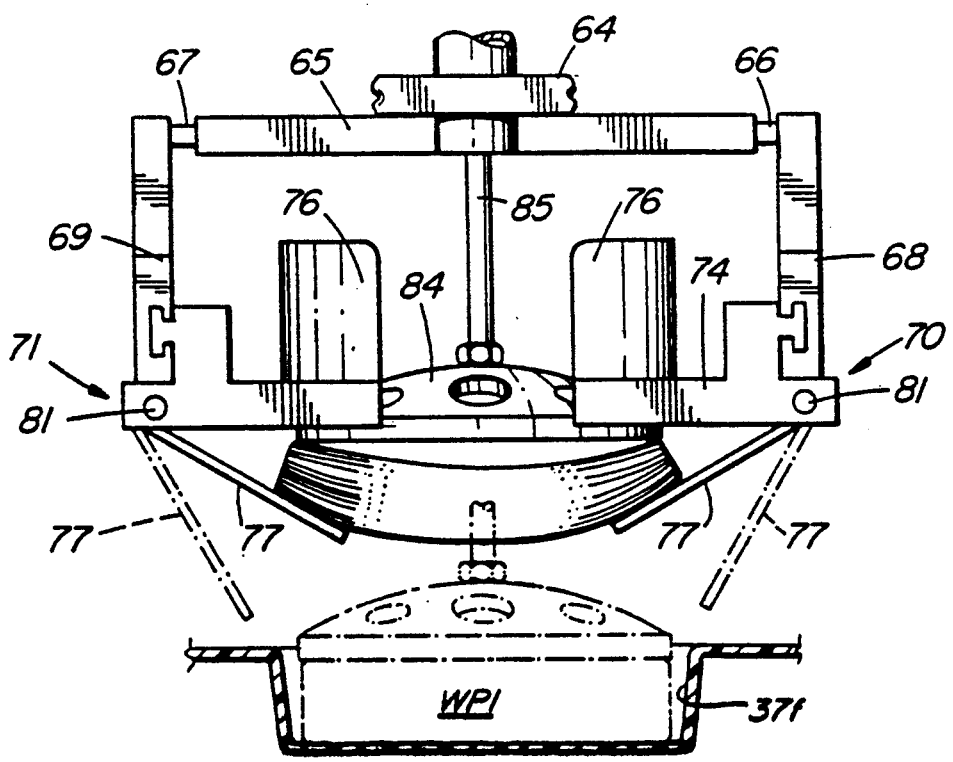
Figure 13A:
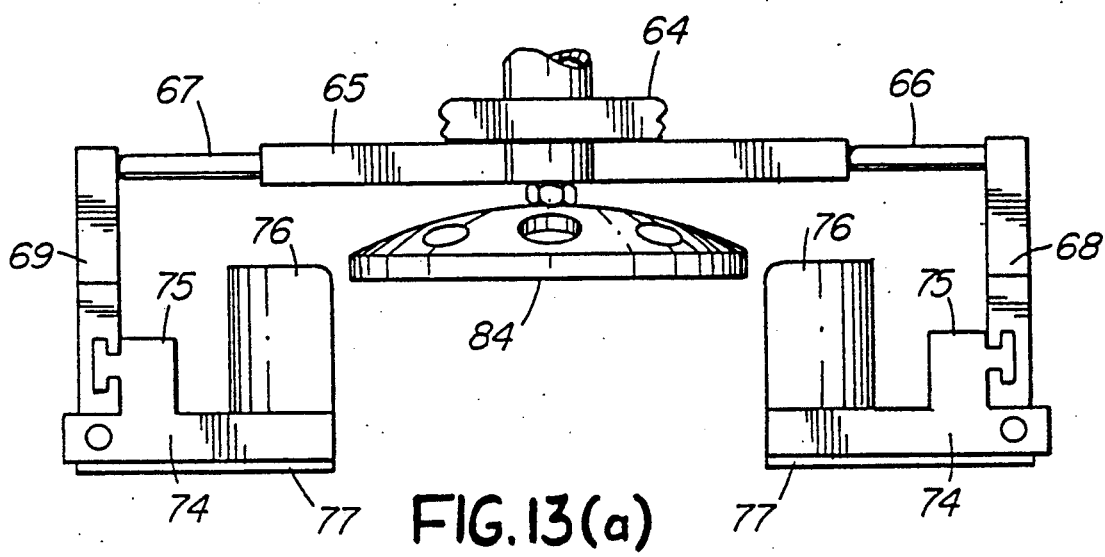
Figure 13B:
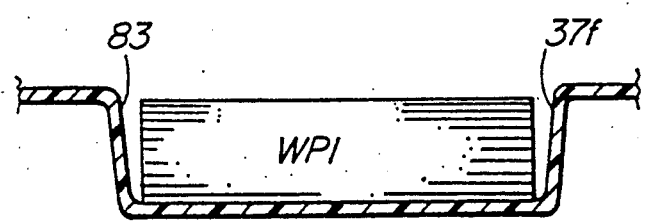

The base panel 64 supports a mounting plate 65. To each side of the mounting plate 65 is secured a set of three slide rods 66, 67 (see also FIGS. 9–13). The slide rods 66, 67 are slidable in the mounting plate 65 transversely of the direction of the conveying path of the conveyor 29 and are capable of assuming a retracted or closed position, which is shown in FIGS. 10, 11, 12, and in an extended or open position, which is shown in FIGS. 2, 9 and 13. The two systems of the slide rods 66 and 67 are adapted to move in mutually opposite directions towards or away from the centre of the shuttle or carriage.

The outer ends of the guide rods 66 are integral with a side plate 68. Similarly, the guide rods 67 are integral with the upper part of the other side plate 69. Each of the side plates 68, 69 and the elements mounted thereon and described hereinafter constitutes an embodiment of "a finger system".

Each side plate 68, 69 supports at its lower end a pair of generally coaxial hinge assemblies 70, 71, 72 and 73. Since most of the parts of the hinge assemblies 70–73 are identical, they are designated with the same reference numerals regardless of which hinge assembly is being referred to.

Each hinge assembly has a mounting plate 74 which is disposed generally horizontally and is provided with an upwardly directed integral web 75 fixedly secured to the respective side plate 68 or 69. The mounting plate 74 supports a lateral workpiece engagement member, also referred to as "stack support means". The member of the embodiment shown is an upright side wall 76 having the shape of the segment of a cylinder. The configuration of the wall 76 is complementary with the outer contour of the workpiece to be processed (in this case cylindric).

The underside of the horizontal plate 74 is generally flush with a finger plate 77 hingedly secured to the respective plate 74 at the respective hinge assembly. The plate 77 forms a bottom of a space whose outer side is defined by the respective side member 76.

Each plate 77 has at its free front edge a number of transverse cutouts which provide transversely pointed fingers 78. At the rear end of each plate 77, a pair of hinge bosses 79, 80 is provided to accommodate a longitudinal hinge pin 81. A coil spring 82 (FIG. 2 and FIG. 8) urges the plate 77 into the generally horizontal position which is shown in full lines of FIG. 8, in FIGS. 9, 10, 11, 13 and also in FIG. 2. The action of spring 82 is such that the plate 77 can resiliently swing downwardly as best shown in FIG. 12, when subjected to a downwardly directed force of a given magnitude.

In the embodiment shown in the drawings, the front edge of the plate 77 is generally coincident with the contour of the mounting plate 74 as seen in an end view (FIG. 10). It will be appreciated, however, that, if desired, the arrangement can be such that the plates 77 would each protrude beyond the inner contour of the associated mounting plate 74. The rating of the springs 82, of course, is such that the possibility of inadvertent downfall of the workpiece by its own weight cannot occur.

Thus, it will be appreciated that the pair of opposed finger plates 77 and fingers 78 can be also forms part of the respective "opposed finger systems" including fingers 78 which are normally generally horizontal, parallel and coplanar. The fingers 78 of the plate 77 to the right of FIG. 8 are the fingers of one such "system" and the fingers which are not visible in FIG. 8, but are incorporated in the left part of the arrangement shown are those of the other "system". While a plurality of fingers 78 is shown, it can be seen that as few as one finger can be provided at one plate and at least one second finger has to be provided at the opposed plate 77, the plate 77 and the entire assembly being, of course, a mere part of the finger system.

The actuation means for selectively moving the finger systems from an open position (FIG. 9 or FIG. 13) to a closed position which is represented in FIG. 11 or FIG. 10, is actually a suitable mechanism drawing the transverse sliding rods 66 and 67 in a direction toward each other, i.e. from the open position of FIG. 9 to the closed position of FIG. 10. The actual mechanism operating the rods 66 and 67 is preferably a pneumatic system but a mechanical arrangement could be used also. The entire finger systems 74–82, of course, move simultaneously with their respective guide rods 66, 67.

The described mechanism of moving the entire carriage along the rods 59, 60 can also be referred to as "second actuation means" of the carriage for moving the closed finger systems from a first position (the position of shuttle 34 in FIG. 1), to a second position (shuttle 32 in FIG. 1) in which the fingers are disposed at the unloading station.

At the unloading station there is provided discharge means for discharging the workpiece from the carriage 32 into a packaging tray cavities 36, 37, disposed each in a complementary support 83. The shuttle includes, for each pair of the finger systems, a vertically reciprocating plunger 84. The plunger located at one pair of finger systems is referred to with reference numeral 84 (left of FIG. 2 and at the lower part of FIG. 1) and the plunger at the other end of the shuttle with reference numeral 84A. Each plunger is connected by a suitable piston rod 85 to an associated vertical pneumatic cylinder 86. Each cylinder has lower port 87 and an upper port 88 for selective supply or bleeding of pressurized air to or from the respective end of a piston (not shown) associated with the respective plunger 84 or 84A.

In operation, let it be assumed that cavities 36–37 and 36a–37a and 36c–37c are already loaded or, if not loaded, would remain empty and would eventually become discarded. The position of the shuttles 32–34 along the guide rods (such as rods 59, 60) is of no consequence as all shuttles are in an "open" position wherein the associated slide rods 66, 67 are extended. All plungers 84, 84A are raised. The "open" position is seen, for instance, in FIG. 9 or 13.

The channelizing means 21 and the conveyors 29, 30 and 31 are running. All sleeves 25 travel centrally of the channelizing means as the diverters 26, 27 are inactive. The transverse conveyor 35 (FIG. 1) is loaded with thermoplastic trays, each tray forming a cavity 36 or 37. The conveyor 35 is so arranged that each pair of the guide rods such as rods 59, 60 is aligned with the adjacent cavities 36f-37f; 36d-37d; 36b-37b. Other pairs of adjacent cavities 36c-37c; 36e-37e; are disposed between adjacent unloading stations of the shuttles 32, 33 and 34. Thus, the cavities 36b and 37b are aligned with the shuttle 34 and conveyor 31, a pair of intermediate cavities 36c, 37c is disposed between the conveying path of conveyors 31 and 30, another pair of cavities 36d, 37d is aligned with the path of conveyor 30, another pair of intermediate cavities 36e, 37e is between the paths of conveyors 30 and 29 and (unmarked) cavities 36f, 37f are not visible in FIG. 1 as they are overlapped by the shuttle 32. Further pairs of cavities 36g-37g, 36h-37h and 36i-37i are disposed upstream of the shuttle unloading station.

When a workpiece arrives at the end of conveyor 20, a sensor S (FIG. 1) disposed at the discharge end of the conveyor 20 senses the presence of the workpiece and activates a control command which engages the diverter 26 with the underside of sleeves 25. The timing of the diversion is such that when the workpiece (a stack of sliced meat) arrives, supported by the respective sleeves 25, at the upstream end of diverter 26, the diverter 26 diverts all sleeves supporting the workpiece to the conveyor 29.

Figure 3:
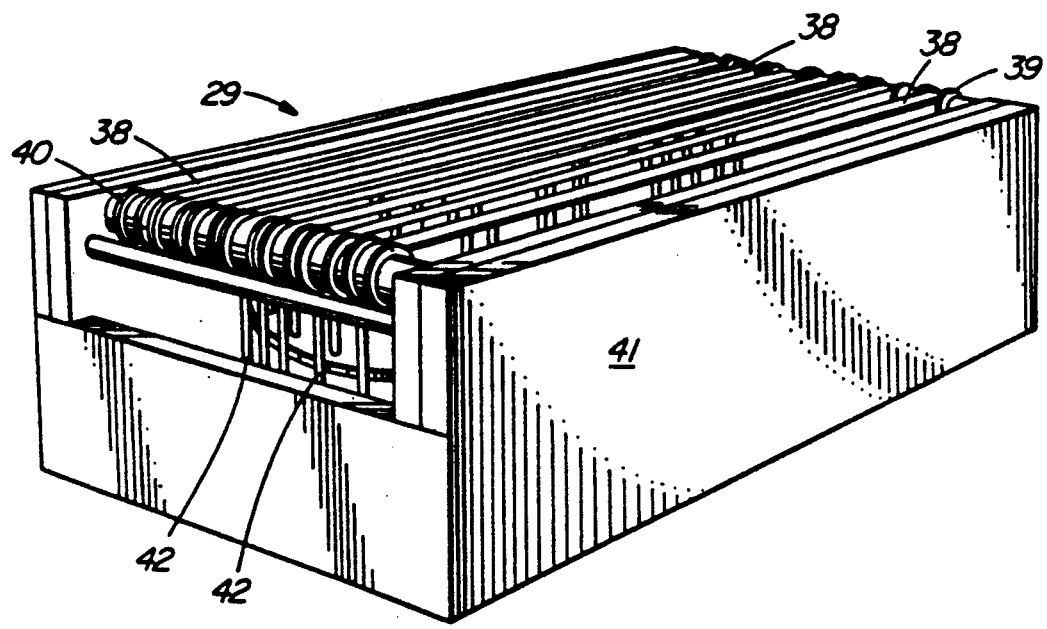
FIGS. 3–6 are simplified perspective views of one of the three conveyors shown in a side-by-side arrangement in FIG. 1, the views showing different stages of operation of the invention.
Figure 4:
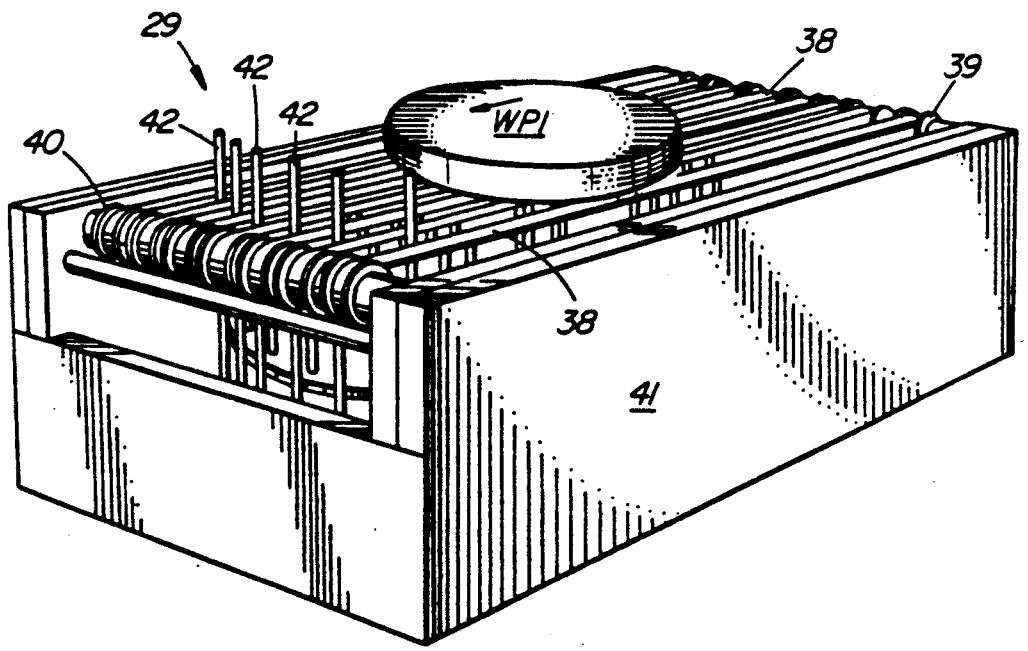
Figure 5:
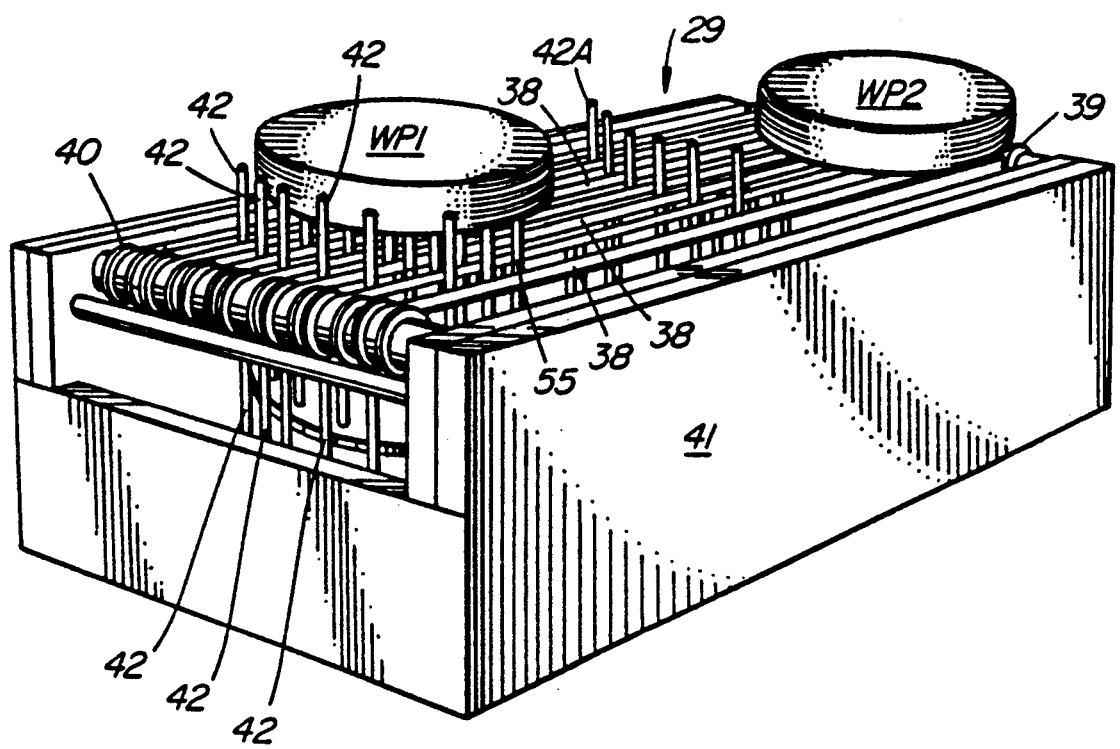
Figure 6:
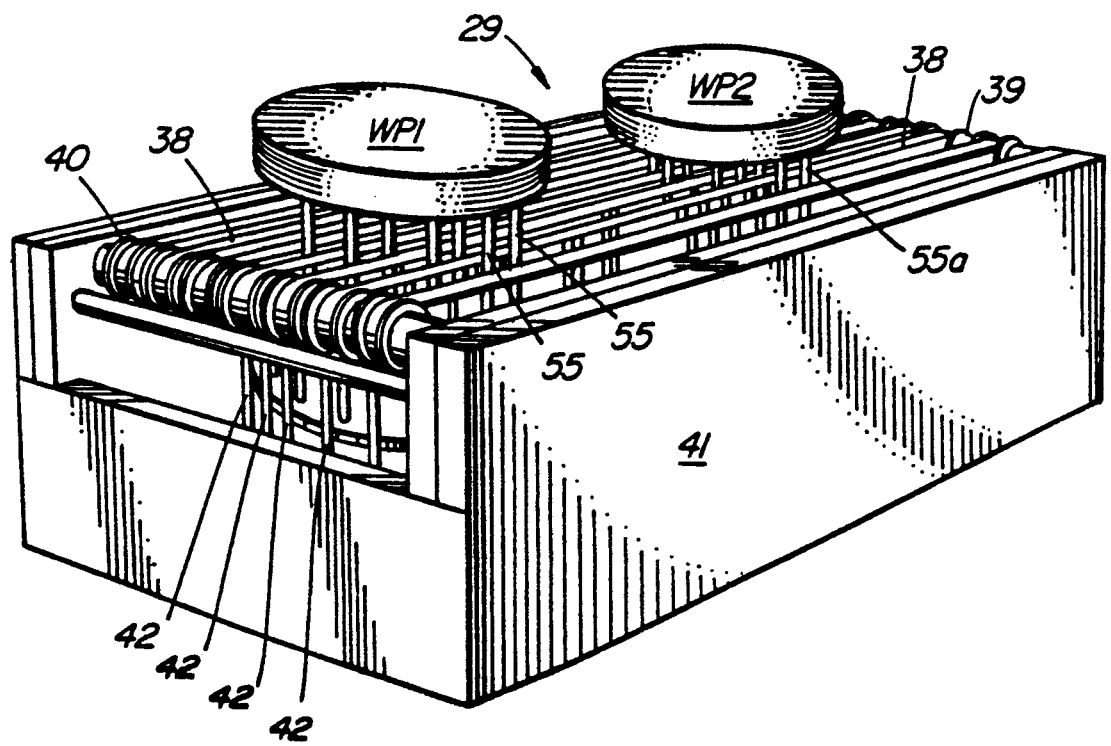

The retainer pins 42 of the conveyor 29 have been raised from a retracted position of FIG. 3 to the extended position of FIG. 4.

The system of diverting the sleeves 25 is so programmed that a first stack of sliced meat, referred to as workpiece WP1, is delivered to the upstream end of conveyor 29. FIG. 3 shows a situation wherein the workpiece has not yet arrived. In FIG. 4, the workpiece WP1 has arrived. The pins 42 are raised as shown in FIG. 3. Eventually, the movement of the stack WP1 is arrested by pins 42. The stack WP1 is then stationary, while the running bands 38 slide underneath the workpiece. The force at which the stack WP1 hits the pins 42 is sufficient to cause the counter-clockwise pivoting of the cylinder 45 (FIG. 7) to engage the microswitch 49 which results in actuation of cylinder 50 which now raises the support stems or pins 55 to elevate stack WP1 out of contact with the bands 38 of conveyor 29. The raising of the pins 55 is sensed by a suitable sensing switch (not shown) which provides a command to lower the pins 42 and to raise the arresting pins 42A. This state is similar to that of FIG. 5, except that the second stack WP2 has not arrived yet.

In the meantime, a further stack WP1 has arrived at the sensor S, triggering a subsequent series of commands. The sleeves 25 are now out of contact with diverters 26, 27 and thus deliver the second stack WP to the upstream end of conveyor 30. Then another, third workpiece WP1 is diverted by the diverter 27 to the conveyor 31.

The next stack delivered to sensor S is a first stack WP2. It is again diverted to the conveyor 29 in the same fashion as the first stack Wp1. It hits the retainer pins 42A causing the actuation of the microswitch 49A which results in actuation of the pneumatic cylinder 50A and subsequent raising of the support pins 55A to elevate WP2 above the conveyor 29. At the same time the second retaining pins 42A are lowered. The workpieces WP1 and WP2 are now in the state of FIG. 6.

The shuttle 32 is moved (or has already been moved), from its position shown in FIG. 1 to the position at the opposite end of its guide rods 59, 60, over the raised stacks WP1, WP2. During this motion, which is caused by the displacement of the ferromagnetic cores 61 within the rods 59, 60, and with the guide rods 66 and 67 being in extended (open) state, all parts of the shuttle clear the vertical contour of the elevated workpieces WP1, WP2 so that the shuttle can move along the workpieces.

The shuttle is now so aligned with the workpieces WP1, WP2 that the upright side walls 76 face each the respective workpiece WP1 and WP2. Only the first workpiece WP1 is visible in FIG. 9 which depicts the situation just described.

In the next step, the guide rods 66, 67 of shuttle 32 are brought into a contracted (closed) state by a suitable pneumatic drive mechanism which is not shown. This results in a position shown in FIG. 10. The workpieces WP1, WP2 are still supported on the pins 55, 55A protruding between the bands 38 of the conveyor 29. The fingers 78 now extend with their tips beyond the associated support pins 55, 55A and are now disposed below the underside of the workpiece WP1 (see the broken-away detail in FIG. 10).

When this state is reached, the support pins 55, 55A are lowered by the corresponding actuation of the pneumatic cylinders 50, 50A whose lower ports 51, 51A are now the bleeding ports and the ports 52, 52A are pressurized. The lowering of the pins 55, 55A results in a situation very similar to that of FIG. 10, the only difference being in that the workpieces WP1, WP2 now rest with their undersides on the respective finger plates 77, and the pins 55, 55A are well below the level of the upper run of the belts 38. At this stage, the drive of the shuttle 32 is effected by pneumatically displacing the ferromagnetic cores 61 in the rods 59, 60 while simultaneously maintaining the electromagnets operatively associated with the sleeves 62, 63 active. The displaced ferromagnetic cores thus carry with them the sleeves 62, 63 and move the loaded shuttle 32 down to the position which corresponds to the position of shuttle 32 in FIG. 1.

In an end view, the state now achieved is apparent from FIG. 11. The workpiece WP1 is supported by the respective finger plates 77 and is disposed above the cavity 37f (FIG. 1). When this position is reached, a signal is given to actuate the cylinders 86 and their associated plungers 84, 84A. Upon admission of pressurized air at the ports 88 of cylinders 86, the cylinder 86 drive the associated plungers 84, 84A rapidly in a downward stroke, to strike the workpieces WP1, WP2 down, overcoming the resistance of the springs 82 and forcing the finger plates 77 to swing downwardly (FIG. 12) to eventually arrive in a position shown in broken lines of FIG. 12, wherein the plungers have driven the workpieces WP1, WP2 into the cavities 36f-37f.

At this point, the drive of the guide rods 66 and 67 is actuated to spread the mounting plates (and thus the finger systems) apart whereupon the plungers 84, 84A can be again raised to the position shown in FIG. 13. In this state, the unloaded shuttle is free to move back to a position over the conveyor 29 regardless whether further workpiece or workpieces have already been arranged there in the meantime, ready for a further cycle.

The described operation of the shuttle 32 (and of the other shuttles) is simultaneous for both pairs of finger plates 77 and plungers 84, 84A. The number of the pickup mechanisms, formed by the finger plates 77, is optional but if changed from the system of two pickup mechanisms, a corresponding modification of the retainer and support finger systems 42, 55 must be made to accommodate the change in the number of pairs of finger sections.

Thus, the described arrangement results in the loading of the trays 36g, 37g by the shuttle 32. In a similar fashion, the loading of the trays 36d, 37d is carried out by the shuttle 33, and the shuttle 34 loads in the same fashion the cavities 36b. 37b.

When the loading of all six cavities 36b–37b, 36d–37d and 36f–37f is finished, the conveyor 35 is actuated to conduct an indexed movement, whereby cavities 36f–37f become disposed in the position previously occupied by cavities 36c–37c. The trays 36c–37c remain unloaded only at the outset of the operation and may be discarded or circulated back to the filling or unloading station. The remaining cavities 36, 37 are simultaneously moved by three positions to the left of FIG. 1. For instance, trays 36d–37d are now where trays 36a–37a were before etc. The whole cycle of the filling of the six cavities is then repeated.

Those skilled in the art will readily appreciate that the indexing of the conveyor 35 depends on the number of shuttles 32, 33, 34 and also upon the spacing between the individual unloading stations. The number of pairs of cavities 36–37 between adjacent unloading stations, however, should be the multiple of a whole number.

The advantage of the present invention, when compared with the above prior art, is in the structural simplicity and easy modification to different workpieces. This is due to the fact that all driven elements of the device are designed to be driven along a linear path in reciprocating fashion thus avoiding the need for complex mechanical drive units and replacing same with pneumatic cylinders as a preferred drive. The sequence of actuation of the pneumatic cylinders and the sensing of different positions can be easily controlled by commercially available means preferably in a computerized way. The described sequence is an example which could be modified within the scope of the invention, to a greater or lesser degree. The same applies to the number of unloading stations associated with each shuttle.

Many modifications of the disclosed arrangement can be made to meet particular production demands, without departing from the scope of the present invention. Accordingly, the present invention is not limited to the described embodiment. We wish to protect by letters patent which may issue on this application all other embodiment which reasonably fall within the scope of our contribution to the art.

I claim:

1. Apparatus for transfer of a workpiece having a predetermined shape and size, from conveyor means having a generally horizontal conveying path defined by an upper run of a number of parallel, spaced-apart endless bands trained about guide roller means, to an unloading station remote from the conveyor means, said apparatus comprising, in combination:
    a) workpiece retainer means including at least two stop members spaced apart transversely of the conveying path, said stop members being associated with the conveyor means for selectively assuming a retracted position, wherein the stop members clear said conveying path, and an extended position in which the stop members protrude, between the respective bands, above the conveying path, to retain the workpiece on the conveying path while the conveyor continues to run;
    b) workpiece raising means including a set of at least three normally generally vertical support pins spaced apart and adapted to selectively assume a lowered position in which position the tops of the pins clear the conveying path, and a raised position, in which position the support pins extend upwardly between the bands, with the tops disposed above the conveying path, the tops being arranged in a pattern for supporting a respective workpiece previously retained by said retainer means;
    c) carriage means for engaging a respective raised workpiece supported on the tops and for carrying the workpiece away from said conveyor means to said unloading station, said carriage means including
        i) a pair of opposed finger systems defining a plurality of normally generally horizontal, parallel and coplanar fingers, one system including at least one first finger, the other system including at least one second finger, said first and second fingers pointing in opposite directions, each toward the opposed finger system
        ii) first actuation means for selectively moving the finger systems from an open position wherein free end portions of the fingers are remote from each other and from a respective raised workpiece, to a closed position wherein the free end portions are adapted to be disposed immediately underneath a respective raised workpiece, whereby, upon lowering of the raising means, the workpiece rests upon the horizontal fingers;
        iii) second actuation means for moving the closed finger systems from a first position wherein the fingers are disposed above the conveyor means, to a second position in which the fingers are disposed at the unloading station;
        iv) discharge means for discharging the workpiece from the carriage means to said unloading station.

2. Apparatus as claimed in claim 1, wherein said first actuation means is adapted to move the finger systems along a first linear path.

3. Apparatus as claimed in claim 2, wherein the first linear path is transverse to the conveying path.

4. Apparatus as claimed in claim 1, wherein, in the closed position, at least one of said fingers extends between two of said support pins.

5. Apparatus as claimed in claim 1, wherein each finger system is mounted for pivoting about a separate pivot axis, from the normally generally horizontal position of the fingers to a discharge position wherein the respective fingers slope downwardly to allow a respective workpiece to be discharged therebetween while the finger systems are in the closed position.

6. Apparatus as claimed in claim 5, wherein the pivot axes of the finger systems are parallel with each other and with the conveying path.

7. Apparatus as claimed in claim 6, wherein said finger systems are spring loaded to resiliently maintain the generally horizontal position of the fingers.

8. Apparatus as claimed in claim 6, wherein each finger system is provided with a lateral workpiece engagement member complementary with the periphery of a respective workpiece and movable, in common with the respective finger system, from an open position, wherein the engagement member clears the workpiece, to a closed position, wherein the engagement member is in contact with the periphery of a respective workpiece.

9. Apparatus as claimed in claim 6, 7 or claim 8, wherein the carriage means further includes plunger means mounted generally centrally above the fingers for reciprocating movement in a generally vertical direction, and plunger actuation means for driving the plunger downwardly a sufficient distances to engagement a respective workpiece and to force the spring loaded finger systems to pivot the fingers to said discharge position whereby the workpiece is discharged from the carriage.

10. Apparatus for transfer of two workpieces, having a generally identical, predetermined shape and size, from conveyor means having a generally horizontal conveying path defined by an upper run of a number of parallel, spaced-apart endless bands trained about guide roller means, to an unloading station remote from the conveyor means, said apparatus comprising, in combination:
  a) first workpiece retainer means and second workpiece retainer means, said first and second retainer means being disposed one after the other along the conveying path of said conveyor means, each workpiece retainer means including stop means, each stop means including at least two stop members spaced apart transversely of the conveying path, said stop members being associated with the conveyor means for selectively assuming a retracted position, wherein the stop members clear said conveying path, and an extended position in which the stop members protrude, between the respective bands, above the conveying path, to retain the respective workpiece on the conveying path while the conveyor continues to run;
  b) first workpiece raising means and second workpiece raising means, said workpiece raising means being disposed one after the other along the conveying path of the conveyor means, each workpiece raising means including a set of at least three normally generally vertical support pins spaced apart and adapted to selectively assume a lowered position in which position the tops of the pins clear the conveying path, and a raised position, in which position the support pins extend upwardly between the bands, with the tops disposed above the conveying path, the tops being arranged in a pattern for supporting a respective workpiece previously retained by the respective retainer means;
  c) carriage means for engaging respective raised workpieces supported on the tops and for carrying the workpieces away from said conveyor means to said unloading station, said carriage means including
    i) a first pair of opposed finger systems and a second pair of opposed finger systems, said pairs of opposed finger systems being spaced from each other in a direction longitudinally of the conveying path, at a distance corresponding to the spacing of the first workpiece raising means from the second workpiece raising means, each finger system of each pair of opposed finger systems including at least one first finger, the other, opposed finger system including at least one second finger, said first and second fingers pointing in opposite directions, each toward the opposed finger system;
    ii) each of said pairs of finger systems being provided with first actuation means for selectively moving the respective finger systems from an open position wherein free end portions of the respective fingers are remote from each other and from a respective raised workpiece, to a closed position wherein the free end portions are disposed immediately underneath a respective raised workpiece, whereby, upon lowering of the respective raising means, the respective workpiece rests upon the horizontal fingers of the respective pair of finger systems;
    iii) said carriage means being provided with second actuation means for moving both pairs of the closed finger systems from a first position wherein the fingers are disposed above the conveyor means, to a second position in which the fingers are disposed at the unloading station;
    iv) discharge means for discharging the workpiece from the carriage means to said unloading station.

11. Apparatus as claimed in claim 10, wherein said first actuation means is adapted to move the respective finger systems along a first linear path.

12. Apparatus as claimed in claim 10, wherein the first linear path is transverse to the conveying path.

13. Apparatus as claimed in claim 10, wherein, in the closed position, at least one of the fingers of a respective pair of finger systems extends between two of the support pins of the associated workpiece raising means.

14. Apparatus as claimed in claim 10, wherein each finger system of each pair of finger systems is mounted for pivoting about a separate pivot axis, from the normally generally horizontal position of the fingers to a discharge position wherein the respective fingers slope downwardly to allow a respective workpiece to be discharged therebetween while the respective finger systems are in the closed position.

15. Apparatus as claimed in claim 14, wherein the pivot axes of the finger systems are parallel with each other and with the conveying path.

16. Apparatus as claimed in claim 15, wherein each of said finger systems is spring loaded to resiliently maintain the generally horizontal position of the respective fingers.

17. Apparatus as claimed in claim 15, wherein each finger system is provided with a lateral workpiece engagement member complementary with the periphery of a respective workpiece and movable, in common with the respective finger system, from an open position, wherein the engagement member clears the workpiece, to a closed position, wherein the engagement member is in contact with the periphery of a respective workpiece.

18. Apparatus as claimed in claim 15, 16 or 17, wherein the carriage means further includes two plunger means, mounted each generally centrally above the respective fingers for reciprocating movement in a generally vertical direction, and plunger actuation means for driving the respective plunger means downwardly sufficient distances to engage a respective workpiece and to force the fingers of the respective spring loaded finger systems to pivot to said discharge position whereby the workpiece is discharged from the carriage.

19. Apparatus for the handling of stacks of sliced food product along a linear path from a stack source to a stack packaging means operating transversely to the apparatus which apparatus comprises:
   a) channelizing means;
   b) at least one loading zone with at least one loading position;
   c) at least one transfer carriage;
   d) at least one unloading zone associated with the transverse stack packaging means;
   e) the channelizing means being adapted to receive and direct successive stacks to a selected loading zone;
   f) each loading zone further including an endless multi-banded conveyor for movement of stacks through said zone to a loading position, with stack detection and arresting means and stack elevating means associated with the loading position;
   g) each said transfer means including carriage means reciprocally moveable in a linear direction parallel with said path, between the loading station and the unloading station, the carriage having stack support means adapted to cooperate with the stack elevating means during loading to substantially support the stack during loading and subsequent movement of the carriage;
   h) each said carriage further including ejection means associated with the unloading zone for discharge of stacks from the support means into a receiving cavity moveable transversely through the unloading station by the stack packaging means; and
   i) said stack detection and arresting means comprises a plurality of vertically oriented pins selectively moveable between an operative position extending above the path of the conveyor to arrest further movement of a stack by the conveyor, and a retracted inoperative position below said path.

20. The apparatus of claim 19, wherein said stack support means comprises counterposed transversely reciprocating flaps, adapted to interdigitate with said stack elevating means, said flaps further including resilient hinge means connecting each flap to the carriage means.

21. The apparatus of claim 19, wherein said stack support means includes stack shaping means.

22. The apparatus of claim 19, wherein the stack elevating means comprises a plurality of vertically oriented pins, sufficient to support a stack, selectively moveable between an inoperative position below the path of said conveyor, and an operative extended position above said path.

* * * * *